United States Patent [19]

Bell

[11] 3,836,083
[45] Sept. 17, 1974

[54] SHOWER HEAD WITH FLOW CONTROL WASHER

[75] Inventor: Frank W. Bell, Avon, Ohio

[73] Assignee: Stanadyne, Inc., Windsor, Conn.

[22] Filed: Oct. 11, 1973

[21] Appl. No.: 405,624

[52] U.S. Cl.................. 239/572, 239/460, 138/45
[51] Int. Cl............................ B05b 1/30, F15d 1/00
[58] Field of Search ............. 138/43, 45, 45 A, 46; 239/570, 571, 572, 460

[56] References Cited
UNITED STATES PATENTS

| | | | |
|---|---|---|---|
| 2,559,894 | 7/1951 | Nordell | 239/562 X |
| 2,680,043 | 6/1954 | Campbell | 239/570 X |
| 2,948,300 | 8/1960 | Fraser | 138/45 |
| 3,592,237 | 7/1971 | Borschers | 138/43 |
| 3,693,888 | 9/1972 | Rondas et al. | 138/46 X |
| R24,534 | 9/1958 | Dahl | 138/45 |

*Primary Examiner*—Robert S. Ward, Jr.
*Attorney, Agent, or Firm*—Kinzer, Plyer, Dorn & McEachran

[57] ABSTRACT

A flow control washer for use in a plumbing fixture such as a shower head is formed of a distortable rubberlike material and has a generally cylindrical shape. There are a plurality of independent water passages through the washer, with the passages being axially aligned. A distortable projection is positioned between each pair of passages. The pressure of water upon the washer causes the projections to distort, partially restricting the openings into the passages, thus controlling the flow of water through the plumbing fixture.

12 Claims, 4 Drawing Figures

PATENTED SEP 17 1974　　　　　　　　　　　　　　3,836,083
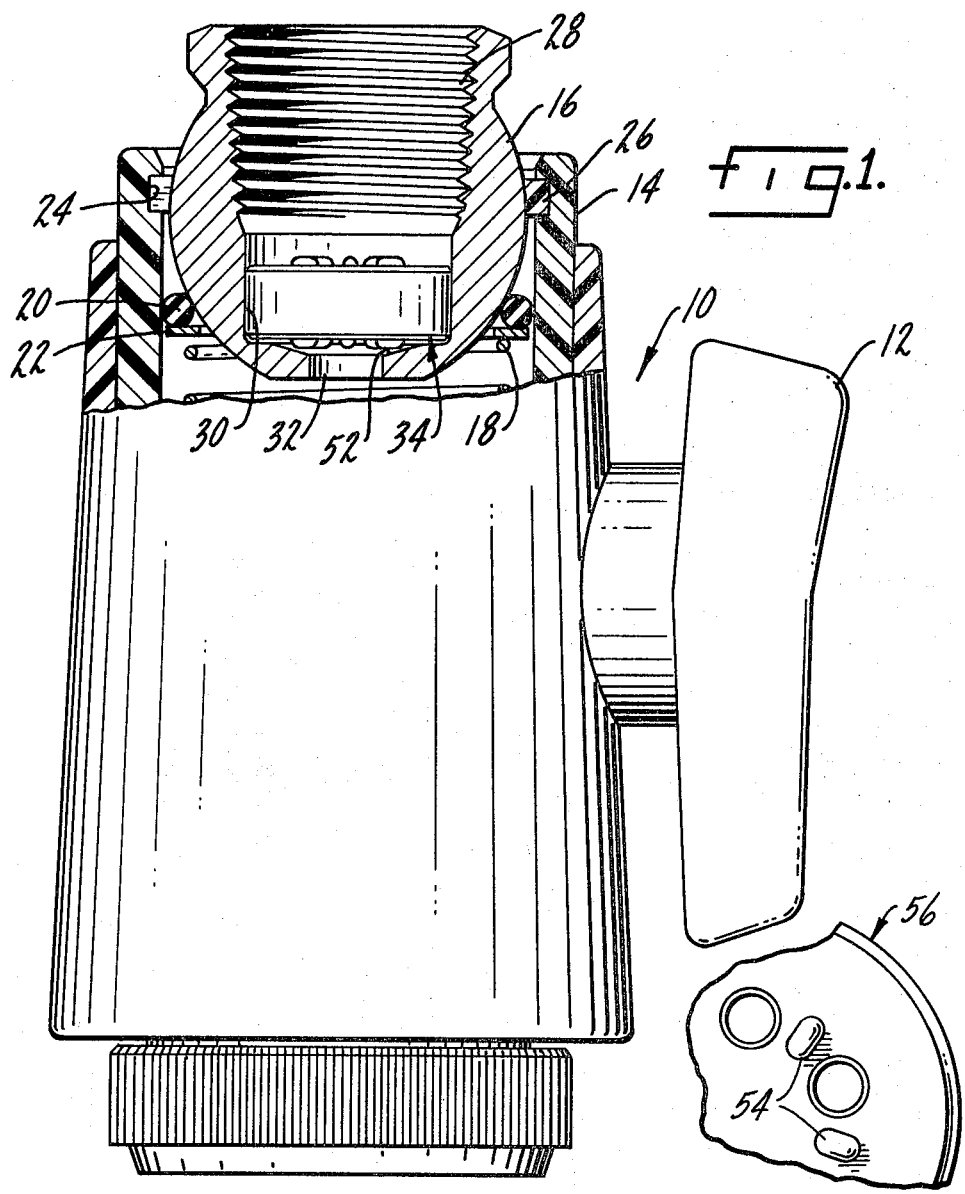
fig.1.
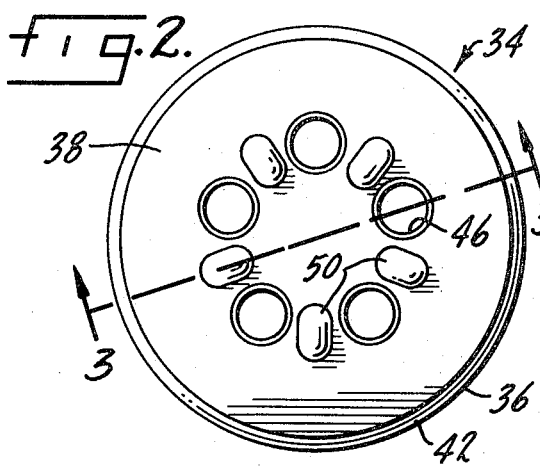
fig.2.
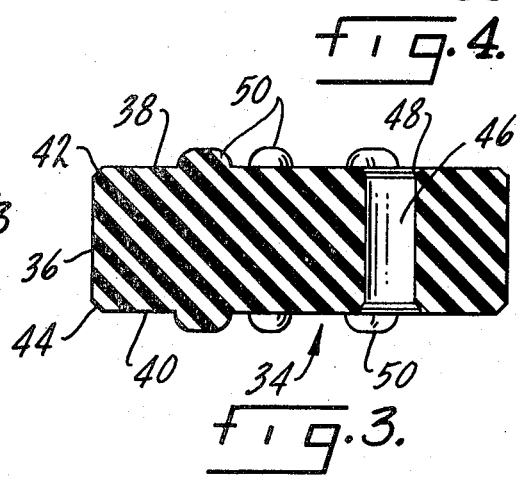
fig.3.
fig.4.

SHOWER HEAD WITH FLOW CONTROL WASHER

SUMMARY OF THE INVENTION

This invention relates to a flow control washer and in particular to such a washer which regulates flow without noticeable noise or vibration.

A primary purpose of the invention is a flow control washer of the type described which can provide a generally constant flow of water to a plumbing fixture.

Another purpose is a flow control washer for use in a plumbing fixture of the type described which controls the flow of water, but substantially eliminates noise normally attendant to a water restriction.

Another purpose is a flow control washer of the type described which is symmetrical, thus eliminating any error in placement.

Another purpose is a flow control washer having dissimilar ends to provide for alternative flow rates.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, of a shower head,

FIG. 2 is an enlarged top plan view of the flow control washer of the present invention, FIG. 3 is a section along plane 3—3 of FIG. 2, and FIG. 4 is a partial top plan view of a modified form of the invention.

DESCRIPTION OF THE PREFERRED EMBODIMENT

The flow control washer described herein has application in many types of plumbing fixtures where it forms an effective waterway. By way of illustration, the washer is shown in a shower head where it has been found to be highly advantageous.

In FIG. 1, the shower head assembly is indicated generally at 10 and may have a manual control 12 for use in adjusting the type and volume of spray. The assembly 10 has a body 14 which is mounted to a swivel or ball 16. A spring 18, O-ring 20, and a washer 22 are used in attaching the body 14 to the swivel 16. Near the upper end of the body 14 there is a groove 24 mounting a snap ring 26. The spring 18 applies an upward bias to firmly hold the swivel 16 within the body 14. Details of the attachment of the swivel to the body are shown in application Ser. No. 353,734, filed Apr. 23, 1973, licensed to the assignee of the present application.

The swivel 16 may have an internal threaded area 28 which is used to attach the swivel to a suitable water conduit as is conventional. Adjacent the opposite end of the swivel 16 there is a cylindrical chamber 30 which is in communication with a water passage or opening 32. Thus, water flowing through the water conduit will pass into the threaded area 28, then into the chamber 30, through the flow control washer 34, to be described hereinafter, and then out the opening 32 into the main part of the shower head.

The washer 34 is generally cylindrical in form having a cylindrical side 36 and opposite ends 38 and 40. There may be beveled edges 42 and 44 where the ends join the cylindrical side 36.

A plurality of equally sized and generally equally circumferentially positioned water passages 46 are formed axially through the washer 34. As clearly shown in FIG. 2, the radial distances between the axis of each passage 46 and the center of the washer 34 are equal. Thus, the centers of the water passages are all on the circumference of a circle circumscribed about the center of the washer. The opposite ends of each passage 46 are generally symmetrical and may include beveled areas 48.

Positioned between each pair of adjacent passages 46 is a projection 50, shown in FIGS. 1 and 3, as having the shape of a small bump, with the surface being arcuate or spherical or round. The projections 50 are generally equally spaced from each other, with the center of each projection being on the same circle as the centers of the passages 46. The ends 38 and 40 each have the same number and similarly arranged projections 50 so that the flow control washer is symmetrical. Thus, it cannot be incorrectly positioned within the chamber 30.

The washer 34 is formed of a suitable distortable rubber-like material, with the preferred material having a durometer hardness of from 60 to 65. The hardness may vary with the desired flow of water through the washer, as the harder the material used in the washer, the less restriction that will be applied to the water passages.

In FIG. 1, the lower end of chamber 30, adjacent the opening 32, is downwardly slanted, as at 52, such that when the washer 34 is seated within the chamber, the projections 50 may rest upon the surface 52. The slanted surface 52 thus permits constant communication between the lower end of the passages 46 and the opening 32.

In use, water flowing through passages 46 will flow out of the opening 32. As the pressure of the water increases, the projections 50 will tend to distort or flatten or deflect and at least partially close off or restrict the openings of passages 46. Thus, the combination of the projections 50 and passages 46 control the flow of water through the washer. For example, a washer of the present type, having a hardness of approximately 60 durometer, can provide a flow of water to the spray portion of the shower head of from 2½ to 3 gallons per minute over an applied water pressure variation of from 40–120 psi. The identical shower head without such a washer showed a flow variation of from 3.75 to 6.75 gallons per minute over the same water pressure variation.

The projections 50 are so formed in combination with the size of the adjacent passages that the passages are never completely closed. The application of pressure flattens or distorts the projections which tends to restrict the opening into the passages, thus regulating the passage openings in accordance with the applied pressure. Water flow remains relatively constant over a rather wide variation in applied water pressure.

The ratio of the length of the passages 46 to their diameter is important in reducing the tendency of the unit to resonate under high pressure. If the washer does resonate, noise is generated and one of the objects and advantages of the present flow control washer is to eliminate noise which is normally a part of a water restriction. Thus, not only does the flow control washer 34 regulate the flow of water into the spray assembly, but it reduces any noise which is normally attendant upon such water control.

In the modification of FIG. 4 projections 54 are slightly smaller than the projections 50 of FIG. 3. The projections on the opposite side of the washer 56 of FIG. 4 may be the same as the projections 50, thus forming a washer having dissimilar sides. Since the size of the projections determine the amount of restriction applied to the water passages, the washer 56 can provide two different flow raes, depending upon which size projection faces upstream.

The hole size, the precise shape of the projections 50 and the hardness of the rubber all are variables and all can be used to provide a given range of water flow over a given range of applied water pressure.

Whereas the preferred form of the invention has been shown and described herein, it should be realized that there may be many modifications, substitutions and alterations thereto.

The embodiments of the invention in which an exclusive property or privilege is claimed are defined as follows:

1. A flow control washer for use in plumbing fixtures or the like including a generally cylindrical body formed of a distortable rubberlike material, a plurality of circumferentially arranged water passages extending axially through said body, a plurality of projections extending outwardly from at least one end of said body there being a projection generally adjacent each water passage, said projections being integral with said body and, under pressure, distorting to restrict the openings into said passages for controlling the flow of water through said passages with variations in applied water pressure.

2. The flow control washer of claim 1 further characterized in that said water passages all have the same diameter.

3. The flow control washer of claim 1 further characterized in that said water flow passages are generally equally circumferentially spaced, with all passages having their axes the same radial distance from the center of the body.

4. The flow control washer of claim 3 further characterized in that there is a projection positioned between each pair of adjacent water passages.

5. The flow control washer of claim 4 further characterized in that the center of each projection is generally on a circle whose center is the center of the body and whose radius is equal to the radial distance of the passage axes from the center.

6. The flow control washer of claim 1 further characterized in that the ends of said body are symmetrical, there being an equal number of projections, similarly spaced, extending from both ends of the body.

7. The flow control washer of claim 1 further characterzed by differently sized projections extending from opposite ends of said body.

8. A shower head including a spray forming assembly, means for attaching said spray forming assembly to a water conduit including a mounting member, means formed adjacent one end of said mounting member for attaching it to a conduit, an opening in the opposite end of said mounting member, a cylindrical chamber formed in said mounting member adjacent said opening, a flow control washer positioned within said cylindrical chamber and adjacent said opening, said flow control washer including a generally cylindrical body formed of a distortable rubberlike material, a plurality of circumferentially arranged water passages extending axially through said body and in communication with said mounting member opening, a plurality of projections extending outwardly from both ends of said body, there being a projection generally adjacent each water passage, said body being symmetrical with the projections on opposite ends being similarly arranged, said projections being integral with said body and distortable under pressure to restrict the openings into said passages for controlling the flow of water through said passages with variations in water pressure applied to the upstream end of the body.

9. The shower head of claim 8 further characterized in that said water passages all have the same diameter.

10. The shower head of claim 8 further characterized in that said water flow passages are generally equally circumferentially spaced, with all passages having their axes the same radial distance from the center of the body.

11. The shower head of claim 10 further characterized in that there is a projection positioned between each pair of adjacent water passages.

12. The shower head of claim 11 further characterized in that the center of each projection is generally on a circle shoe center is the center of the body and whose radius is equal to the radial distance of the passage axes from the center.

* * * * *